| (12) | United States Patent<br>Zhang et al. | (10) Patent No.: US 12,255,408 B2<br>(45) Date of Patent: Mar. 18, 2025 |

(54) PHASED ARRAY TRANSCEIVER ELEMENT

(71) Applicant: IMEC VZW, Leuven (BE)

(72) Inventors: Yang Zhang, Heverlee (BE); Jan Craninckx, Boutersem (BE); Pierre Wambacq, Groot-Bijgaarden (BE); Giuseppe Gramegna, Golfe Juan (FR)

(73) Assignee: Imec VZW, Leuven (BE)

( * ) Notice: Subject to any disclaimer, the term of this patent is extended or adjusted under 35 U.S.C. 154(b) by 211 days.

(21) Appl. No.: 18/185,181

(22) Filed: Mar. 16, 2023

(65) Prior Publication Data

US 2023/0299478 A1 Sep. 21, 2023

(30) Foreign Application Priority Data

Mar. 18, 2022 (EP) .................................... 22163072

(51) Int. Cl.
*H04B 7/0408* (2017.01)
*H01P 1/213* (2006.01)
(Continued)

(52) U.S. Cl.
CPC .............. *H01Q 3/34* (2013.01); *H01P 1/213* (2013.01); *H01P 5/12* (2013.01); *H04B 7/0408* (2013.01)

(58) Field of Classification Search
CPC .. H01Q 3/34; H01P 1/213; H01P 5/12; H04B 7/0408
See application file for complete search history.

(56) References Cited

U.S. PATENT DOCUMENTS 7,773,965 B1 8/2010 Van Brunt et al.
10,567,063 B1 2/2020 Bakeer et al.
(Continued)

FOREIGN PATENT DOCUMENTS

EP 2584651 A1 4/2013

OTHER PUBLICATIONS

European Search Report and Opinion, Application No. EP 22163072. 6, mailed Sep. 20, 2022, 9 pages.
(Continued)

*Primary Examiner* — Jaison Joseph
(74) *Attorney, Agent, or Firm* — McDonnell Boehnen Hulbert & Berghoff LLP

(57) ABSTRACT

A phased array transceiver element comprises a local oscillator stage for generating beamformed in-phase and quadrature local oscillator signals, the local oscillator stage comprising a phase shifter connectable to a reference frequency source and applying a first phase shift; a primary frequency multiplier input from the phase shifter and applying a primary frequency multiplication factor; a phase-splitting arrangement input from the primary frequency multiplier and having a first output and a second output, the phase-splitting arrangement applying a second phase shift at the first output and a third phase shift at the second output; a first secondary frequency multiplier input from the first output of the phase-splitting arrangement, having an output for the in-phase local oscillator signal, and applying a secondary frequency multiplication factor; and a second secondary frequency multiplier input from the second output of the phase-splitting arrangement, having an output for the quadrature local oscillator signal, and applying the secondary frequency multiplication factor.

20 Claims, 3 Drawing Sheets

(51) Int. Cl.
*H01P 5/12* (2006.01)
*H01Q 3/34* (2006.01)

(56) References Cited

U.S. PATENT DOCUMENTS

| | | | |
|---|---|---|---|
| 2004/0137869 | A1 | 7/2004 | Kim |
| 2005/0285786 | A1 | 12/2005 | Fayyaz |
| 2013/0093624 | A1 | 4/2013 | Raczkowski et al. |
| 2019/0058245 | A1* | 2/2019 | Safavi Naeini ........ H01Q 3/267 |
| 2020/0200867 | A1* | 6/2020 | Belfiore ................. H03B 19/14 |
| 2023/0299478 | A1* | 9/2023 | Zhang .................. H04B 7/0408 |
| | | | 343/702 |

OTHER PUBLICATIONS

Apriyana, Alit, Jiang Luo, Qian Chen, Guangyin Feng, and Hao Yu. "A CMOS sub-terahertz full-duplex phased array transceiver for short-distance data center communication." In 2017 IEEE International Symposium on Radio-Frequency Integration Technology (RFIT), pp. 56-58. IEEE, 2017.

Farid, Ali A., Arda Simsek, Ahmed SH Ahmed, and Mark JW Rodwell. "A broadband direct conversion transmitter/receiver at D-band using CMOS 22nm FDSOI." In 2019 IEEE Radio Frequency Integrated Circuits Symposium (RFIC), pp. 135-138. IEEE, 2019.

Banerjee, Aritra, Kristof Vaesen, Akshay Visweswaran, Khaled Khalaf, Qixian Shi, Steven Brebels, Davide Guermandi et al. "Millimeter-wave transceivers for wireless communication, radar, and sensing." In 2019 IEEE Custom Integrated Circuits Conference (CICC), pp. 1-11. IEEE, 2019.

Soliman, Yasser, and Ralph Mason. "A frequency multiplication based LO phase shifting technique for phased-array architectures." In 2010 IEEE Radio and Wireless Symposium (RWS), pp. 88-91. IEEE, 2010.

Meng, Qingrui, and Ramesh Harjani. "A 4GHz instantaneous bandwidth low squint phased array using sub-harmonic LO based channelization." In ESSCIRC 2018-IEEE 44th European Solid State Circuits Conference (ESSCIRC), pp. 110-113. IEEE, 2018.

Ebrahimi, Najme, Po-Yi Wu, Mahdi Bagheri, and James F. Buckwalter. "A 71-86-GHz phased array transceiver using wideband injection-locked oscillator phase shifters." IEEE Transactions on Microwave Theory and Techniques 65, No. 2 (2017): 346-361.

Iskandar, Zyad, Alexandre Siligaris, Jose Lugo-Alvarez, Emmanuel Pistono, and Philippe Ferrari. "A 270-to-300 GHz LO-path phase shifting architecture for sub-mm-wave phased arrays." In 2018 48th European Microwave Conference (EuMC), pp. 804-806. IEEE, 2018.

* cited by examiner

PHASED ARRAY TRANSCEIVER ELEMENT

CROSS-REFERENCE TO RELATED APPLICATIONS

The present application is a non-provisional patent application claiming priority to European Patent Application No. EP 22163072.6, filed on Mar. 18, 2022, the contents of which are hereby incorporated by reference.

FIELD OF THE DISCLOSURE

The present disclosure relates to a phased array transceiver element, to a phased array transceiver comprising a plurality of such transceiver elements, and to a method of generating a beamforming phase-shifted local oscillator signal.

BACKGROUND

A phased array may comprise a plurality of transceiver (TRX) elements, wherein each transceiver element typically may be connected to a respective antenna in an antenna array, wherein the antennas of the array have a predetermined spacing. The phased array may generate an RF beam in a desired direction though applying a phase difference between the respective antennas. The phase difference may be programmable for adjusting the direction of propagation.

A typical phased array transceiver element may comprise a mixer block for up-converting one or more baseband (BB) signals to radio frequency (RF), wherein the baseband signal is mixed with one or more high-frequency local oscillator (LO) signals. Typically, in-phase and quadrature local oscillator signals are input to the mixer, having a nominal phase difference of 90 degrees. In the mixer, the in-phase local oscillator signal is mixed with an in-phase baseband signal and the quadrature local oscillator signal mixed with a quadrature baseband signal, for forming the modulated radio frequency signal output to the antenna.

To achieve the required phase difference, a respective phase shift is generated at each transceiver element. Several conventional techniques for generating such a phase shift are utilized. One such technique comprises generating the phase shift at the local oscillator before mixing with the baseband signal in the mixer.

Given the complex modulation schemes currently in use, generally, there is a need for providing a transceiver element than can generate ever more accurate in-phase and quadrature signals.

SUMMARY

To this end, according to a first aspect, there is provided a phased array transceiver element comprising a local oscillator stage for generating beamformed in-phase and quadrature local oscillator signals, the local oscillator stage comprising a phase shifter connectable to a reference frequency source and applying a first phase shift; a primary frequency multiplier input from the phase shifter and applying a primary frequency multiplication factor; a phase-splitting arrangement input from the primary frequency multiplier and having a first output and a second output, the phase-splitting arrangement applying a second phase shift at the first output and a third phase shift at the second output; a first secondary frequency multiplier input from the first output of the phase-splitting arrangement, having an output for the in-phase local oscillator signal, and applying a secondary frequency multiplication factor; and a second secondary frequency multiplier input from the second output of the phase-splitting arrangement, having an output for the quadrature local oscillator signal, and applying the secondary frequency multiplication factor.

Throughout this disclosure, a "local oscillator stage" should be understood as a stage, module, component, or the like, configured for generating one or more signals suitable for mixing with the one or more baseband signals at the mixer stage. As such, a local oscillator stage according to this disclosure may comprise a local oscillator (LO), or some alternative means for generating the one or more local oscillator signals, such one or more frequency converters, frequency multipliers, or the like. Specifically, a local oscillator stage as understood according to this disclose may be configured to input a reference signal and generate one or more signals suitable for mixing, i.e., local oscillator signal, through frequency multiplication, frequency conversion, phase-shifting, or the like, of the reference signal, in one or more steps.

Further, throughout this disclosure, the terms transceiver and transceiver element should be understood as encompassing a device arranged for at least generating a signal to be transmit a signal, i.e., including the case of a device arranged for both transmitting and receiving as well as the case of a device arranged only for transmitting, i.e., a transmitter.

According to some of the embodiments provided herein, the first phase shift, which may correspond to a beamforming phase shift, may be performed before the primary frequency multiplier and the secondary frequency multipliers. Further, phase-splitting for the in-phase signal and the quadrature signal may be performed before the secondary frequency multipliers. Thus, the beamforming phase shift and the phase splitting may be performed at lower frequencies than the local oscillator frequency, usually corresponding to the frequency of the transmitted radio frequency signal. Since the frequency multipliers also function as phase multipliers, the respective phase shifts may be performed at a reduced phase range as compared to a phase shift performed at the local oscillator frequency. This reduces the difficulty of design, especially at high frequencies.

Further again, the placing of the first frequency multiplier between the first phase shifter and the phase splitter allows for the first phase shift to be performed at a different frequency than the phase splitting, decorrelating adjustment of the first phase shift from the phase splitting, better allowing for independent adjusting of the two, since, the phase splitting will remain the same when the first phase shift is changed, typically during beamforming. This reduces design complexity since a change of the first phase shift (beamforming operation) will not require a re-calibration of the phase splitter for generating a proper phase difference between the quadrature local oscillator signal and the in-phase local oscillator signal.

Thus, the features of the phased array transceiver element as provided herein can allow for improved accuracy in the adjustment of the beamforming phase shift, at low design complexity.

The present scheme is particularly well suited when the radio frequency of operation approached the maximal achievable frequency of operation for the employed circuit.

According to one embodiment the first phase shift is adjustable for controlling a local oscillator beamforming phase shift of the in-phase local oscillator signal and/or of the quadrature local oscillator signal. This is a typical application of the first phase shift.

According to one embodiment the first phase shift equals the local oscillator beamforming phase shift divided by the product of the primary frequency multiplication factor and the secondary frequency multiplication factor. This accounts for the phase multiplication of the primary frequency multiplier and the secondary frequency multipliers so that the local oscillator beamforming phase shift may be accurately adjusted at the first phase shifter.

According to one embodiment the difference between the third phase shift and the second phase shift, multiplied by the second frequency multiplication factor, generates the phase difference between the quadrature local oscillator signal and the in-phase local oscillator signal. This allows for setting the second phase shift and the third phase shift so that a proper phase difference, nominally 90 degrees, between the quadrature local oscillator signal and the in-phase local oscillator signal is achieved.

According to one embodiment, the second phase shift and the third phase shift are equal with opposite signs. This is a strightforward way of achieving the proper phase difference between the quadrature local oscillator signal and the in-phase local oscillator signal.

According to one embodiment, the phase splitter is further configured to apply a calibration phase shift at the first output and the second output. Such a calibration phase shift should be understood as an additional phase shift, as compared to a nominal one, applied at the phase shifter for achieving a proper phase difference between the quadrature local oscillator signal and the in-phase local oscillator signal, for example due to imperfections in the circuit.

According to one embodiment, the calibration phase shift is applied with opposite sign at, respectively, the first output and the second output. This is a particularly simple way of applying a calibration phase shift.

According to one embodiment, the phased array transceiver element further comprises a mixer stage, wherein the in-phase local oscillator signal and the quadrature local oscillator signal are input to the mixer stage.

According to one embodiment, the mixer stage further is input from an in-phase baseband signal and a quadrature baseband signal.

According to a second aspect, there is provided a phased array transceiver comprising a plurality of transceiver elements according to the first aspect.

According to a third aspect, there is provided a method of generating a beamforming phase-shifted local oscillator signal, comprising applying a first phase shift to a reference frequency signal, generating a phase-shifted signal; multiplying the phase shifted signal by a first frequency multiplication factor, generating a multiplied signal; applying a second phase shift to the multiplied signal, generating a first intermediate signal; applying a third phase shift to the multiplied signal, generating a second intermediate signal; and multiplying each of the first intermediate signal and the second intermediate signal by a second frequency multiplication factor, generating, respectively, an in-phase local oscillator signal and a quadrature local oscillator signal.

BRIEF DESCRIPTION OF THE FIGURES

The above, as well as additional objects, features, and aspects of the present disclosure, will be better understood through the following illustrative and non-limiting detailed description, with reference to the appended drawings. In the drawings like reference numerals will be used for like elements unless stated otherwise.

DETAILED DESCRIPTION

Figure 1:
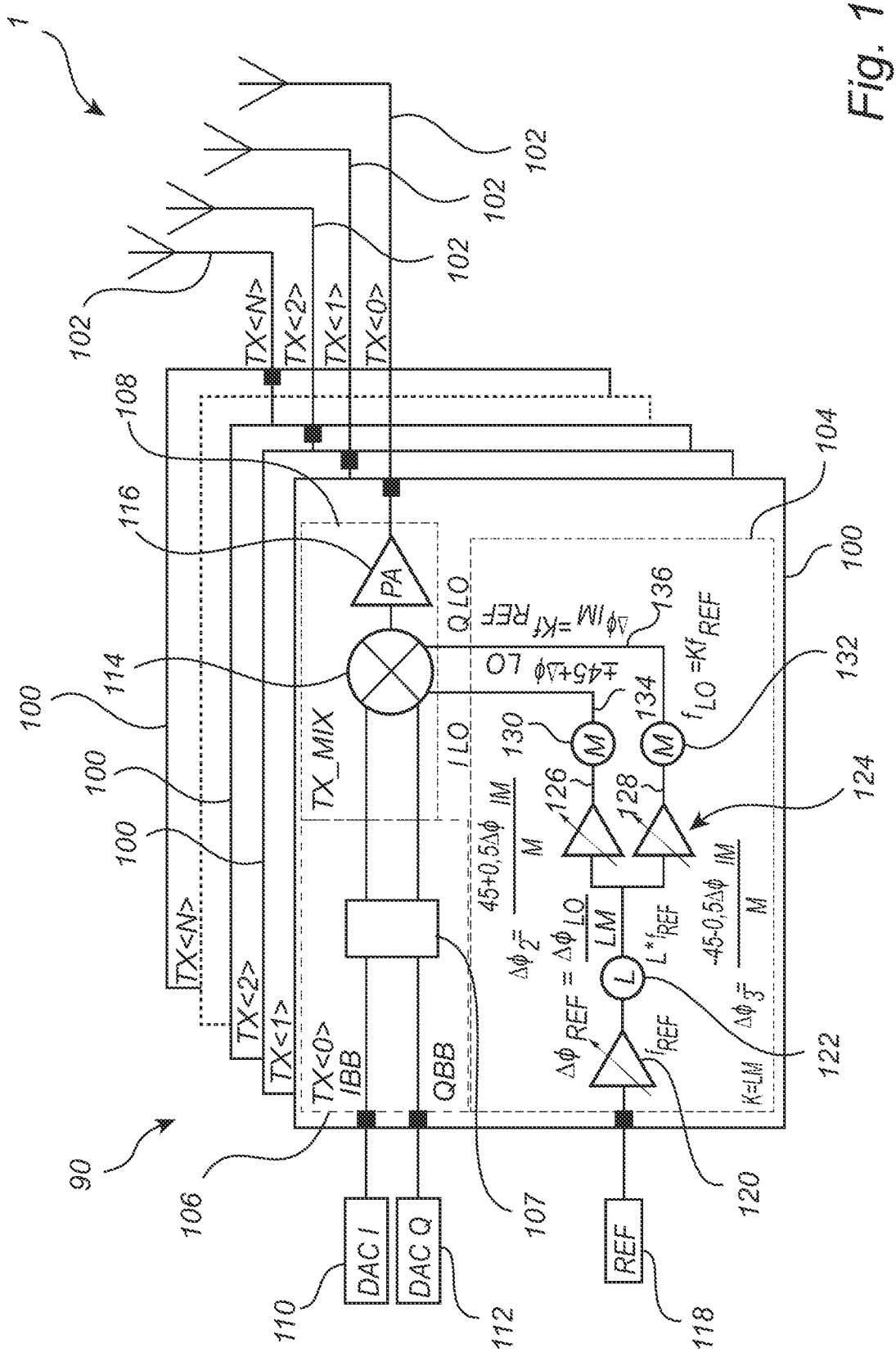
FIG. 1 is a schematic view of a phased array transceiver, according to example embodiments.

FIG. 1 schematically shows a phased array transceiver 90, comprising a plurality of phased array transceiver elements 100.

Each phased array transceiver element 100 is connectable to a respective antenna 102, each of the antennas 102 being comprised in a phased antenna array, as known per se in the art.

As shown, each phased array transceiver element 100 comprises a local oscillator (LO) stage 104, a baseband (BB) stage 106, and a mixer and power amplifier stage 108.

The shown implementation is a so-called zero-intermediate-frequency (ZIF), wherein the local oscillator signal frequency is equal to the frequency of the radio frequency signal. However, the embodiments described herein are also applicable to architectures employing one or more intermediate frequencies (IF).

For digital modulation, as known per se in the art, the baseband stage may be input from an in-phase digital-to-analog converter DAC I 110 and from a quadrature in-phase digital-to analog converter DAC Q 112, respectively providing an in-phase baseband signal I BB and a quadrature baseband signal Q BB. The baseband stage 106 may comprise processing circuitry 107. The baseband stage 106 outputs the in-phase baseband signal and the quadrature baseband signal, optionally as processed by the processing circuitry 107 to the mixer 114 of the mixer stage.

The mixer stage 108 may comprise a mixer 114, and, optionally, a power amplifier PA 116. The mixer stage is connectable to and may output to the respective antenna 102.

The local oscillator stage 104 is configured to generate beamformed in-phase LO I and quadrature LO Q local oscillator signals, as will be elaborated upon in the following. Thus, a method of generating a beamforming phase-shifted local oscillator signal may be implemented in the phased array transceiver element 100.

The local oscillator stage 104 is connectable to a reference frequency source 118. The reference current source may be configured to provide a reference signal having a frequency $f_{REF}$ corresponding to a fraction $1/K=1/(LM)$ of a central and/or carrier frequency of the radio frequency signal generated at the phased array transceiver element 100. The reference signal, having a given phase, may be provided to all transceiver elements 100 of the phased array transceiver 90.

The local oscillator stage 104 comprises a phase shifter 120 connectable to and input from the reference frequency source 118. The phase shifter 120 is configured to apply a first phase shift $\Delta\varphi_{REF}$ to reference frequency signal, i.e., in the present phased array transceiver element 100, to the signal input from the reference frequency source 118. Hereby, the phase shifter 120 will generate and output a phase shifted signal.

Further, the local oscillator stage 104 comprises a primary frequency multiplier 122 input from the primary phase shifter and applying a primary frequency multiplication factor L, generating a multiplied signal output from the primary frequency multiplier. Thus, the multiplied signal will have frequency $L\, f_{REF}$.

Further again, the local oscillator stage 104 comprises a phase-splitting arrangement 124 input from the primary frequency multiplier 122. The phase-splitting arrangement has a first output 126 and a second output 128.

The phase-splitting arrangement 124 is configured for applying a second phase shift $\Delta\lambda_2$ to the multiplied signal at the first output 126, generating a first intermediate signal.

Further, the phase-splitting arrangement 124 is configured for applying a third phase shift $\Delta\varphi_3$ to the multiplied signal at the second output 128, generating a second intermediate signal.

Further again, the local oscillator stage 104 comprises a first secondary frequency multiplier 130 input from the first output 126 of the phase-splitting arrangement 124. The first secondary frequency multiplier 130 is configured to apply a secondary frequency multiplication factor M, thus multiplying the frequency of the first intermediate signal by the first frequency multiplication factor M. The first secondary frequency multiplier 130 has an output 134 for the in-phase local oscillator signal I LO. Thus, the first intermediate signal will have frequency K L $f_{REF}$.

Further again, the local oscillator stage 104 comprises a second secondary frequency multiplier 132 input from the second output 128 of the phase-splitting arrangement 124. The second secondary frequency multiplier 132 is configured to apply the secondary frequency multiplication factor M, thus multiplying the frequency of the second intermediate signal by the secondary frequency multiplication factor M. The second secondary frequency multiplier 132 has an output 136 for the quadrature local oscillator signal Q LO. Thus, the second intermediate signal will have frequency K L $f_{REF}$.

The first phase shift $\Delta\varphi_{REF}$ may be adjustable for controlling a local-oscillator beamforming phase shift of the in-phase local oscillator signal and of the quadrature local oscillator signal. Through the effect of the primary frequency multiplier 122 and each of the secondary frequency multipliers 130, 132, the first phase shift will be multiplied by the primary frequency multiplication factor L and the secondary frequency multiplication factor M. In consequence, the first phase shift $\Delta\varphi_{REF}$ may be applied so that the first phase shift equals the desired local oscillator beamforming phase shift $\Delta_{LO}$ divided by the product of the primary frequency multiplication factor L and the secondary frequency multiplication factor M, i.e., $\Delta\varphi_{LO}=\Delta\varphi_{REF}*(LM)$.

The nominal phase difference between the quadrature local oscillator signal and the in-phase local oscillator signal is, a generally known in the art, 90 degrees. The phase splitting arrangement 124 may be configured to generate such a phase shift through the application of the second phase shift $\Delta\lambda_2$ at the first output 126 and the third phase shift $\Delta\varphi_3$ at the second output 128. Through the effect of, respectively, the first secondary frequency multiplier 130 and the second secondary frequency multiplier 132, the second phase shift $\Delta\lambda_2$ and the third phase shift $\Delta\varphi_3$ will be multiplied by the secondary frequency multiplication factor M.

In consequence, each of the second phase shift $\Delta\varphi_2$ and the third phase shift $\Delta\varphi_3$ may be applied so that the difference between the third phase shift $\Delta\varphi_3$ and the second phase shift $\Delta\lambda_2$ multiplied by the secondary frequency multiplication factor M, equals the phase difference of 90 degrees between the quadrature local oscillator signal and the in-phase local oscillator signal, i.e., $(\Delta\varphi_3-\Delta\varphi_2)$ M=90°, or, equivalently, $(\Delta\varphi_3-\Delta\varphi_2)=90°/M$, thereby generating this phase difference. This may, for example, be achieved by setting $\Delta\varphi_3=+45°/M$ and $\Delta\varphi_2=-45°/M$, i.e., second phase shift $\Delta\lambda_2$ and the third phase shift $\Delta\varphi_3$ being equal with opposite signs.

Further a calibration phase shift $\Delta\varphi_{IM}$ may be applied each of the second phase, shift $\Delta\lambda_2$ and the third phase shift $\Delta\varphi_{IM}$, for example, for correcting for circuit imperfections, for example, so that the 90-degree phase difference between the quadrature local oscillator signal and the in-phase local oscillator signal is maintained. Such a calibration phase shift may, for example, be applied as $\Delta\varphi_3=(+45°+0.54\ \varphi_{IM})/M$ and $\Delta\varphi_2=(+45°-0.50\ \varphi_{IM})/M$, this being applied with opposite sign to the first output and the second output.

Figure 2:
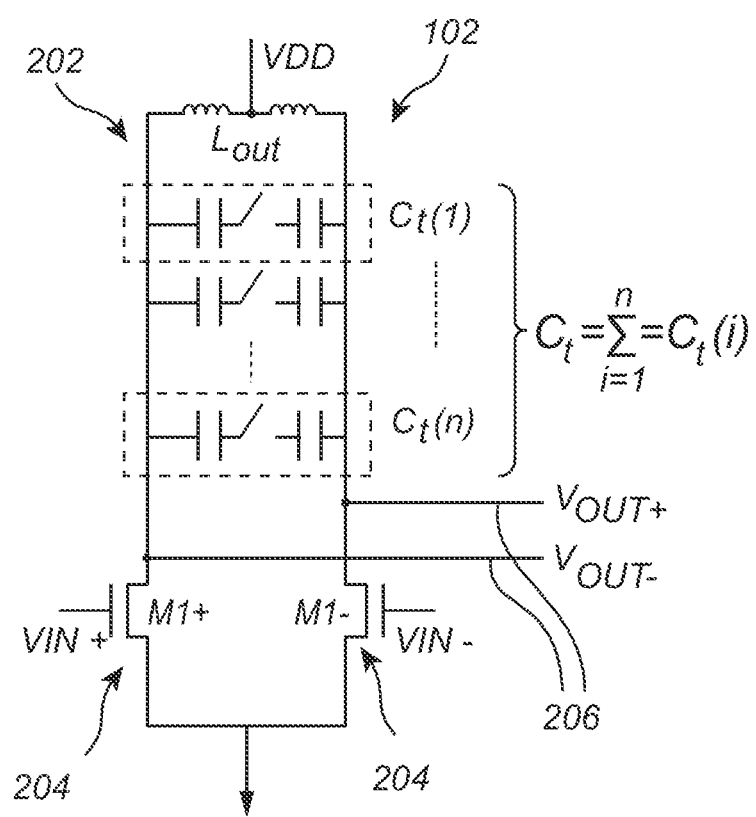
FIG. 2 is a schematic of a phase shifter, according to example embodiments.

FIG. 2 is a schematic of a phase shifter 102 (cf. FIG. 1) of the local oscillator stage 104. The configuration of FIG. 2 should merely be considered an example, and the present disclosure is by no means limited to the specific circuitry presented in FIG. 2.

The phase shifter 102 of FIG. 2 is configured as a voltage buffer comprising a tunable passive load 202. In such implementation, the phase shifting, and voltage buffering are merged, which may reduce design complexity and power consumption.

As shown in FIG. 2, the tunable passive load 202 may comprise one or more inductors Lout and one or more capacitors Ct(1) . . . Ct(n). Further, the phase shifter may comprise a pair of input transistors 204. The tunable passive load 202 and the input transistors 204 may be connected in series, between a supply voltage VDD and ground.

Thus, the voltage buffer may be used to buffer and amplify the signal differentially input at inputs VIN+, VIN− at the respective gate terminals of the input transistors 204, using the two input transistors 204 which are connected to the tunable passive load 202.

The one or more inductors Lout and one or more capacitors Ct(1) . . . Ct(n) may be configured to resonate at the operating frequency of the local oscillator stage 104 (cf. FIG. 1).

A phase shifted signal may be differentially output at outputs VOUT+, VOUT− 206.

The phase shift may be realized by changing the total capacitance Ct of the one or more capacitors Ct(1) . . . Ct(n), by through the phase shifter 102 being configured for individually connecting or disconnecting individual capacitors Ct(1) . . . Ct(n) according to the desired phase shift.

The phase shifter 102 of FIG. 2 is equally applicable, mutatis mutandis, for implementing the phase splitting arrangement 124 (cf. FIG. 1). In particular, two phase shifters 102 according to FIG. 2 may be used, wherein the one or more capacitors Ct(i) are connected/disconnected in an inverted way for each of the two phase shifters. As an example, the first intermediate phase shift can be derived by disconnecting a Ct(i) element from the Ct capacitance array (so generating a positive phase shift with respect to the signal input at the gate terminals of the input transistors 204) while the second intermediate signal can be generated by connecting an element Ct(i) (so generating a negative phase shift with respect to the signal input at the gate terminals of the input transistors 204).

Figure 3:
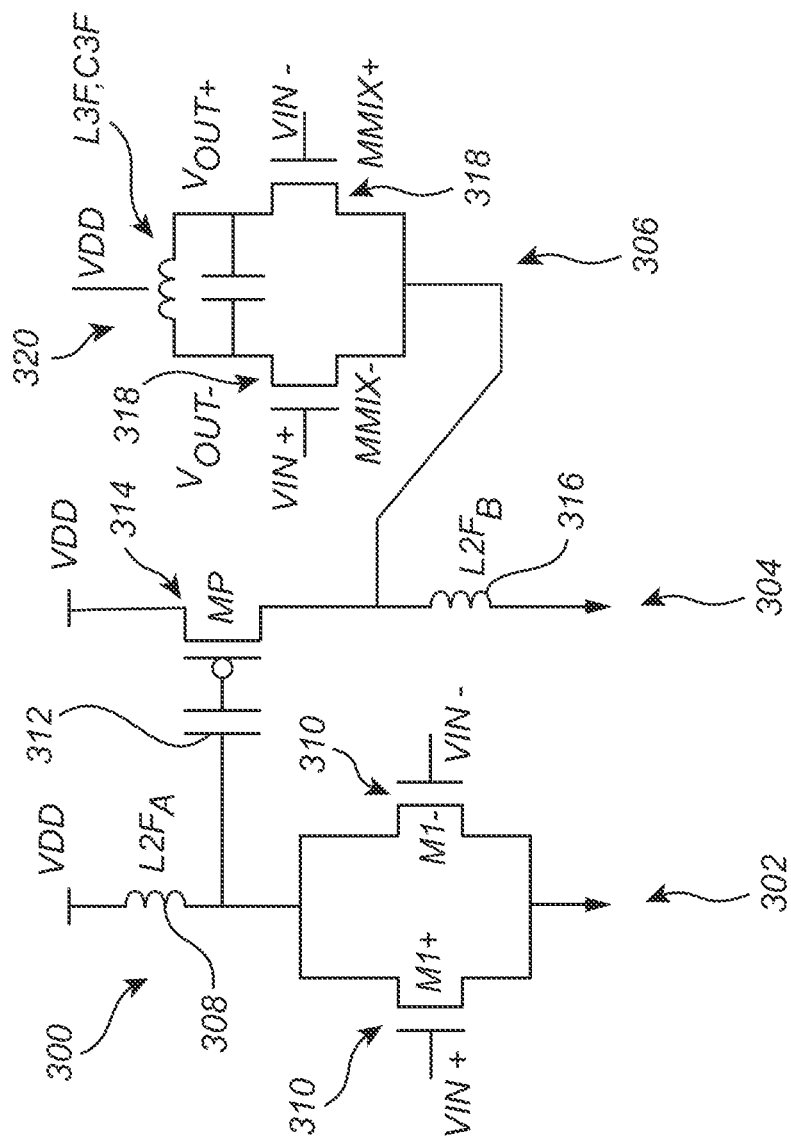
FIG. 3 is a schematic of a frequency multiplier, according to example embodiments.

FIG. 3 is a schematic of a frequency multiplier 300, which may serve, e.g., as the primary frequency multiplier 122, the first secondary frequency multiplier 130, or the second secondary frequency multiplier 132 of the local oscillator stage 104 (cf. FIG. 1). The configuration of FIG. 3 should merely be considered an example, and the present disclosure is by no means limited to the specific circuitry presented in FIG. 3.

The example frequency multiplier 300 of FIG. 3 is configured for a frequency multiplication factor of 3. Naturally other multiplication factors are equally possible.

As shown in FIG. 3, the frequency multiplier 300 may comprise a doubler stage 302, an amplifier stage 304, and a mixer stage 306.

The doubler stage 302 may comprise a load 308, for example in the form of one or more inductors L2FA. Further, the doubler stage 302 may comprise a pair of input transistors 310. The load 308 and the input transistors 310 may be connected in series between a supply voltage VDD and ground.

Through the doubler stage 302, using the pair of input transistors 310 and the load 308, the frequency multiplier 300 may generate a signal at twice the frequency of a signal differentially input at the pair of input transistors 310. Through a capacitor 312, the signal at twice the input frequency may be input to the amplifier stage 304.

The amplifier stage 304 may comprise an amplifier transistor 314 and an amplifier load L2FB 316 connected in series between the supply voltage VDD and ground. The capacitor 312 is connected to a gate terminal of the transistor 314. Hereby, the signal at twice the input frequency generated at the doubler stage 302 may be amplified by the amplifier transistor 314 and the amplifier load 316 of the amplifier stage 304. The thus amplified signal may be input to the mixer stage 306 from a point between the amplifier transistor 314 and the amplifier load 316.

The mixer stage 306, may comprise a pair of mixer transistors 318, a mixer load 320 in the form of one or more capacitors C3F and one or more inductors L3F. The pair of mixer transistors 318 and the mixer load 320 may be connected in series between the supply voltage VDD and the point between the amplifier transistor 314 and the amplifier load 316. The input signal input at the pair of input transistors 310 of the doubler stage 302 may be differentially input at the pair of input transistors 318 of the mixer stage 306.

Hereby, the signal output from the amplifier stage 304, that is at twice the frequency of the signal differentially input at the pair of the transistor 310 of the doubler stage 302, may be mixed with the signal differentially input at the pair of input transistors 318 of the mixer stage 306 to generate a signal at a frequency three times of the frequency of the signal differentially input at the pair of input transistors 310 of the doubler stage 302.

The mixer load 320 may be configured to resonate at a frequency three times of that of the signal differentially input at the pair of input transistors 310 of the doubler stage 302 to reduce signals at any frequency different than the one at three times the operating frequency of the signal differentially input at the pair, so to improve the spectral purity of the generated frequency.

The above description has mainly been accomplished with reference to a limited number of examples. However, as is readily appreciated by a person skilled in the art, other examples than the ones disclosed above are also possible within the scope of the present disclosure, e.g., as defined by the appended claims.

What is claimed is:

1. A phased array transceiver element comprising a local oscillator stage for generating beamformed in-phase and quadrature local oscillator signals, the local oscillator stage comprising:
 a phase shifter connectable to a reference frequency source and applying a first phase shift thereto;
 a primary frequency multiplier that receives input from the phase shifter and that applies a primary frequency multiplication factor thereto;
 a phase-splitting arrangement that receives input from the primary frequency multiplier and that has a first output and a second output, the phase-splitting arrangement applying a second phase shift to the input from the primary frequency multiplier at the first output and applying a third phase shift to the input from the primary frequency multiplier at the second output;
 a first secondary frequency multiplier that receives input from the first output of the phase-splitting arrangement, having an output that outputs the in-phase local oscillator signal, and applying a secondary frequency multiplication factor to the input from the first output of the phase-splitting arrangement; and
 a second secondary frequency multiplier that receives input from the second output of the phase-splitting arrangement, having an output that outputs the quadrature local oscillator signal, and applying the secondary frequency multiplication factor to the input from the first output of the phase-splitting arrangement.

2. The phased array transceiver element of claim 1, wherein the first phase shift is adjustable for controlling a local-oscillator beamforming phase shift of at least one of the in-phase local oscillator signal or of the quadrature local oscillator signal.

3. The phased array transceiver element of claim 2, wherein the first phase shift equals the local oscillator beamforming phase shift divided by a product of the primary frequency multiplication factor and the secondary frequency multiplication factor.

4. The phase array transceiver element of claim 1, wherein a difference between the third phase shift and the second phase shift, multiplied by the second frequency multiplication factor, results in the phase difference between the quadrature local oscillator signal and the in-phase local oscillator signal.

5. The phase array transceiver element of claim 1, wherein the second phase shift and the third phase shift are of equal magnitude and have opposite signs.

6. The phased array transceiver element of claim 1, wherein the phase-splitting arrangement is further configured to apply a calibration phase shift at the first output and the second output.

7. The phased array transceiver element of claim 6, wherein the calibration phase shift applied at the first output has an opposite sign to the calibration phase shift applied at the second output.

8. The phased array transceiver element of claim 1, wherein the phased array transceiver element further comprises a mixer stage, wherein the in-phase local oscillator signal and the quadrature local oscillator signal are input to the mixer stage.

9. The phased array transceiver element of claim 8, wherein the mixer stage also receives inputs from an in-phase baseband signal and from a quadrature baseband signal.

10. A phased array transceiver comprising a plurality of phased array transceiver elements, wherein a given phased array transceiver element of the plurality of phased array transceiver elements comprises a local oscillator stage for generating beamformed in-phase and quadrature local oscillator signals, the local oscillator stage comprising:
 a phase shifter connectable to a reference frequency source and applying a first phase shift thereto;

a primary frequency multiplier that receives input from the phase shifter and that applies a primary frequency multiplication factor thereto;

a phase-splitting arrangement that receives input from the primary frequency multiplier and that has a first output and a second output, the phase-splitting arrangement applying a second phase shift to the input from the primary frequency multiplier at the first output and applying a third phase shift to the input from the primary frequency multiplier at the second output;

a first secondary frequency multiplier that receives input from the first output of the phase-splitting arrangement, having an output that outputs the in-phase local oscillator signal, and applying a secondary frequency multiplication factor to the input from the first output of the phase-splitting arrangement; and a second secondary frequency multiplier that receives input from the second output of the phase-splitting arrangement, having an output that outputs the quadrature local oscillator signal, and applying the secondary frequency multiplication factor to the input from the first output of the phase-splitting arrangement.

11. The phased array transceiver of claim 10, wherein the first phase shift is adjustable for controlling a local-oscillator beamforming phase shift of at least one of the in-phase local oscillator signal or of the quadrature local oscillator signal.

12. The phased array transceiver of claim 11, wherein the first phase shift equals the local oscillator beamforming phase shift divided by a product of the primary frequency multiplication factor and the secondary frequency multiplication factor.

13. The phase array transceiver of claim 10, wherein a difference between the third phase shift and the second phase shift, multiplied by the second frequency multiplication factor, results in the phase difference between the quadrature local oscillator signal and the in-phase local oscillator signal.

14. The phase array transceiver of claim 10, wherein the second phase shift and the third phase shift are of equal magnitude and have opposite signs.

15. The phased array transceiver of claim 10, wherein the given phased array transceiver element further comprises a mixer stage, wherein the in-phase local oscillator signal and the quadrature local oscillator signal are input to the mixer stage.

16. The phased array transceiver of claim 15, wherein the mixer stage also receives inputs from an in-phase baseband signal and from a quadrature baseband signal.

17. A method of generating a beamforming phase-shifted local oscillator signal, comprising:

applying a first phase shift to a reference frequency signal, thereby generating a phase-shifted signal;

multiplying the phase shifted signal by a first frequency multiplication factor, thereby generating a multiplied signal;

applying a second phase shift to the multiplied signal, thereby generating a first intermediate signal;

applying a third phase shift to the multiplied signal, thereby generating a second intermediate signal; and multiplying each of the first intermediate signal and the second intermediate signal by a second frequency multiplication factor, thereby generating, respectively, an in-phase local oscillator signal and a quadrature local oscillator signal.

18. The method of claim 17, wherein the first phase shift equals a local oscillator beamforming phase shift of at least one of the in-phase local oscillator signal or of the quadrature local oscillator signal divided by a product of the primary frequency multiplication factor and the secondary frequency multiplication factor.

19. The method of claim 17, wherein a difference between the third phase shift and the second phase shift, multiplied by the second frequency multiplication factor, results in the phase difference between the quadrature local oscillator signal and the in-phase local oscillator signal.

20. The method of claim 17, wherein the second phase shift and the third phase shift are of equal magnitude and have opposite signs.

* * * * *